(12) United States Patent
Masuda et al.

(10) Patent No.: US 10,746,541 B2
(45) Date of Patent: Aug. 18, 2020

(54) INSPECTION DEVICE FOR CONVEYOR BELT

(71) Applicant: The Yokohama Rubber Co., LTD., Minato-ku, Tokyo (JP)

(72) Inventors: Mitsutaka Masuda, Hiratsuka (JP); Koji Urabe, Hiratsuka (JP); Tsutomu Inoue, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 14 days.

(21) Appl. No.: 16/071,465

(22) PCT Filed: Jan. 10, 2017

(86) PCT No.: PCT/JP2017/000457
§ 371 (c)(1),
(2) Date: Jul. 19, 2018

(87) PCT Pub. No.: WO2017/126364
PCT Pub. Date: Jul. 27, 2017

(65) Prior Publication Data
US 2019/0025050 A1    Jan. 24, 2019

(30) Foreign Application Priority Data

Jan. 19, 2016  (JP) .................................. 2016-007600

(51) Int. Cl.
*G01N 23/00* (2006.01)
*G01B 15/02* (2006.01)
(Continued)

(52) U.S. Cl.
CPC ............ *G01B 15/02* (2013.01); *G01B 15/00* (2013.01); *G01N 23/04* (2013.01); *B65G 15/36* (2013.01);
(Continued)

(58) Field of Classification Search
CPC ....... G01N 2223/615; G01N 2223/633; G01N 2223/642; G01N 23/04; G01B 15/00; B65G 15/36
See application file for complete search history.

(56) References Cited

U.S. PATENT DOCUMENTS 5,504,794 A * 4/1996 Campas .............. G01B 15/025
378/54
2002/0168047 A1   11/2002 Sawada
(Continued)

FOREIGN PATENT DOCUMENTS

CN        1381717        11/2002
CN        1479867        3/2004
(Continued)

OTHER PUBLICATIONS

International Search Report for International Application No. PCT/JP2017/000457 dated Mar. 21, 2017, 4 pages, Japan.

*Primary Examiner* — Dani Fox
(74) *Attorney, Agent, or Firm* — Thorpe North & Western

(57) ABSTRACT

An inspection device is provided in which X-rays are radiated in a fan-like shape with respect to an extension direction of steel cords, are transmitted through a conveyor belt, and reach an X-ray line sensor. A control device makes an X-ray generator and the X-ray line sensor move in a fixed relative position at a certain speed within a certain movement range in a direction parallel with a plane and orthogonal to an extension direction of the steel cords. The control device generates two-dimensional image information on the basis of an X-ray transmission signal obtained each time the X-ray generator and the X-ray line sensor move a unit amount equal to a pixel pitch of the X-ray line sensor. The control device detects measurement information relating to the conveyor belt and the steel cords on the basis of the obtained two-dimensional image information.

8 Claims, 7 Drawing Sheets

(51) Int. Cl.
  *G01B 15/00* (2006.01)
  *G01N 23/04* (2018.01)
  *B65G 15/36* (2006.01)
  *B65G 43/02* (2006.01)

(52) U.S. Cl.
  CPC ........ *B65G 43/02* (2013.01); *G01N 2223/615* (2013.01); *G01N 2223/633* (2013.01); *G01N 2223/642* (2013.01)

(56) References Cited

U.S. PATENT DOCUMENTS

2004/0066888 A1 4/2004 Omori et al.
2014/0328459 A1 11/2014 Urano et al.

FOREIGN PATENT DOCUMENTS

| | | |
|---|---|---|
| CN | 103376268 | 10/2013 |
| CN | 103776849 | 5/2014 |
| CN | 103975233 | 8/2014 |
| JP | S62-014011 | 3/1987 |
| JP | S62-143252 | 9/1987 |
| JP | S63-025310 | 2/1988 |
| JP | H01-296146 | 11/1989 |
| JP | H07-243836 | 9/1995 |
| JP | 2000-329542 | 11/2000 |
| JP | 2002-148214 | 5/2002 |
| JP | 2008-309649 | 12/2008 |
| JP | 2009-156620 | 7/2009 |
| JP | 2015-081857 | 4/2015 |
| WO | WO 03/046532 | 6/2003 |
| WO | WO 2013/118386 | 8/2013 |

\* cited by examiner

INSPECTION DEVICE FOR CONVEYOR BELT

TECHNICAL FIELD

The present technology relates to an inspection device for a conveyor belt.

BACKGROUND ART

A known conveyor belt used in a conveyor belt device for transporting a target object to be conveyed includes a reinforcing layer including a plurality of steel cords aligned spaced apart from one another and a rubber layer that covers the reinforcing layer.

In manufacturing such a conveyor belt, the dimensions relating to the positions of the steel cords are required to be measured.

Examples of such dimensions include the cord pitch, i.e., the interval between steel cords, the distance between end cords, i.e., the interval between the steel cords positioned at both ends of the conveyor belt in the width direction, and the edge rubber width, i.e., the distance from the end surface of the conveyor belt in the width direction to the outer circumferential surface of the steel cord located adjacent to the end surface.

In the related art, the cross sections of the conveyor belt located at both ends of the conveyor belt in the longitudinal direction are measured by hand for these dimensions using calipers and/or a ruler after the conveyor belt is manufactured.

Thus, the dimensions at the intermediate portion of the conveyor belt in the longitudinal direction is unable to be measured during manufacture of the conveyor belt, and there is a demand for an enhancement in the measurement of dimensions of a conveyor belt.

Japan Unexamined Patent Publication No. 62-143252 describes a device configured to radiate X-rays at a rubber material embedded with steel cords, form a visual image from the transmitted X-rays on a fluorescent screen, image the visual image with a camera, and detect the arrangement of the steel cords.

Japan Unexamined Patent Publication No. 2015-81857 describes a device configured to radiate X-rays at a conveyor belt, detect the transmitted X-rays with a line sensor extending in the direction orthogonal to the extension direction of the steel cords, generate an X-ray transmission image, and obtain the thickness of the rubber layer on the basis of the luminance of the X-ray transmission image.

However, in the device of Japan Unexamined Patent Publication No. 62-143252, there is room for enhancement in ensuring measurement accuracy in imaging a visual image using a fluorescent screen.

Additionally, the device of Japan Unexamined Patent Publication No. 2015-81857 is configured to measure only the thickness of the rubber layer and not the dimensions relating to the positions of the steel cords, such as the cord pitch, the distance between end cords, and the edge rubber width.

SUMMARY

The present technology provides an inspection device for a conveyor belt advantageous in inspecting dimensions relating to positions of steel cords with high accuracy.

The technology provides an inspection device for a conveyor belt including a reinforcing layer that includes a plurality of steel cords aligned at intervals and a rubber layer covering the reinforcing layer, the inspection device including:

an X-ray generator disposed on one side of the conveyor belt in a direction orthogonal to a plane including the plurality of steel cords, the X-ray generator being configured to radiate X-rays toward the plane;

an X-ray line sensor disposed on another side of the conveyor belt in the direction orthogonal to the plane and extending in an extension direction of the plurality of steel cords, the X-ray line sensor being configured to detect X-rays transmitted through the conveyor belt and generate an X-ray transmission signal;

a movement portion configured to move the X-ray generator and the X-ray line sensor in a fixed relative position in a direction parallel with the plane and orthogonal to the extension direction of the plurality of steel cords;

a two-dimensional image information generating unit configured to generate two-dimensional image information from the X-ray transmission signal generated by the X-ray line sensor; and a measurement information detecting unit configured to detect measurement information relating to the conveyor belt and the plurality of steel cords based on the two-dimensional image information.

In an embodiment of the technology, the two-dimensional image information generating unit is configured to generate the two-dimensional image information based on the X-ray transmission signal obtained each time the X-ray generator and the X-ray line sensor move a unit amount equal to a pixel pitch of the X-ray line sensor.

In an embodiment of the technology, the measurement information includes at least one of cord pitch, which is an interval between the plurality of steel cords; distance between end cords, which is an interval between steel cords of the plurality of steel cords positioned at both ends of the conveyor belt in a width direction; edge rubber width, which is a distance from an end surface of the conveyor belt in the width direction to an outer circumferential surface of a steel cord of the plurality of steel cords located adjacent to the end surface; or belt width, which is a distance between end surfaces on both ends of the conveyor belt in the width direction.

In an embodiment of the technology, the X-ray generator includes an X-ray source configured to generate the X-rays and a case configured to house the X-ray source and shield against X-rays generated from the X-ray source; and the case includes a slit through which the X-rays generated from the X-ray source radiate toward the conveyor belt in a band-like manner conforming with the extension direction of the plurality of steel cords.

In an embodiment of the technology, the slit is formed with a length dimension such that a length of a band-like irradiation region of X-rays radiated from the slit at the conveyor belt is equal to or less than a length of the X-ray line sensor in an extension direction of pixels.

According to the embodiment of the technology according to claim 1, as viewed from the extension direction of the plurality of steel cords, the X-rays radiated from the X-ray generator and transmitted through the conveyor belt in the direction orthogonal to the plane including the plurality of steel cords are detected by the X-ray line sensor extending in the extension direction of the steel cords. This keeps distortion in the image of the conveyor belt and the steel cords generated as two-dimensional image information to a minimum. Thus, the two-dimensional image information of the image of the conveyor belt and the steel cords can have high accuracy.

This is advantageous in that highly accurate measurement information relating to the conveyor belt and the steel cords can be obtained for any portion of the conveyor belt in the longitudinal direction and advantageous in that the quality assurance of the conveyor belt can be performed in detail.

The technology is advantageous in that highly accurate inspection can be performed because two-dimensional image information can be obtained at a resolution corresponding to the pixel pitch of the X-ray line sensor.

The technology is advantageous in that the quality assurance of the conveyor belt can be performed in detail.

The technology is advantageous in that, by the X-rays generated from the X-ray source being shielded by the case, the exposure dose of a worker in the vicinity of the inspection device is reduced. This ensures that workers can work for a long time and is advantageous in that work efficiency is increased.

The technology is advantageous in that the amount of radiation of the X-rays radiated from the slit can be set to a minimum, the exposure dose of the worker can be reduced, and work efficiency can be increased.

DETAILED DESCRIPTION

An embodiment of the present technology will be described below with reference to the drawings.

First, a conveyor belt to be inspected by an inspection device for a conveyor belt according to the present embodiment will be described.

Figure 6:
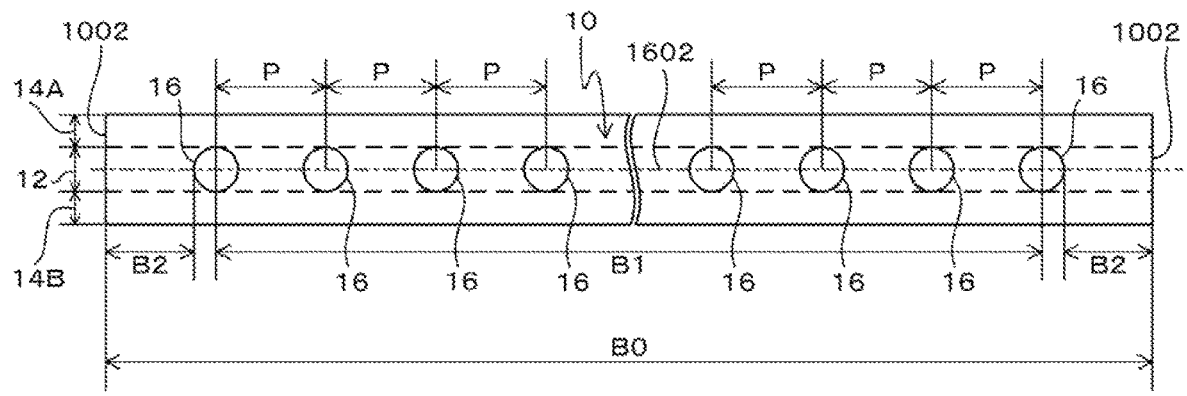
FIG. 6 is a cross-sectional view for explaining dimensions of portions of a conveyor belt.

FIG. 6 is a cross-sectional view of a conveyor belt taken along a plan in the direction orthogonal to the longitudinal direction.

A conveyor belt 10 is used in a conveyor belt device for transporting a target object to be conveyed, such as mineral including iron ore, gravel, and particles.

The conveyor belt 10 includes a reinforcing layer 12, and a pair of rubber layers 14A, 14B.

The reinforcing layer 12 maintains the tension of the conveyor belt 10 and includes a plurality of steel cords 16 that extend in the longitudinal direction of the conveyor belt 10 and are aligned in parallel at intervals in the width direction of the conveyor belt 10.

The pair of rubber layers 14A, 14B cover the surfaces of the reinforcing layer 12 in the thickness direction and, for example, include an upper rubber layer 14A that forms the conveying surface where the target object to be conveyed is placed and a lower rubber layer 14B that forms the surface opposite the conveying surface.

When the conveyor belt 10 is inspected, dimensions such as the following are measured.

(1) Cord pitch P: The interval between the centers of adjacent steel cords 16.

(2) Distance between end cords B1: The interval between the centers of the steel cords 16 located at both ends of the conveyor belt 10 in the width direction.

(3) Edge rubber width B2: The distance from a side surface 1002 of the conveyor belt 10 in the width direction on both sides to the outer circumferential surface of the steel cords 16 adjacent to the side surface 1002.

(4) Belt width B0: The distance between the side surfaces 1002 on both sides of the conveyor belt 10 in the width direction.

Of the dimensions described above, cord pitch P, distance between end cords B1, and edge rubber width B2 are dimensions relating to the positions of the steel cords 16. In the related art, cord pitch P, distance between end cords B1, and edge rubber width B2 are measured at both ends in the longitudinal direction of the conveyor belt 10 using calipers and/or a ruler.

Next, an inspection device of the conveyor belt 10 according to an embodiment (referred to as "inspection device" below) will be described.

Figure 1:
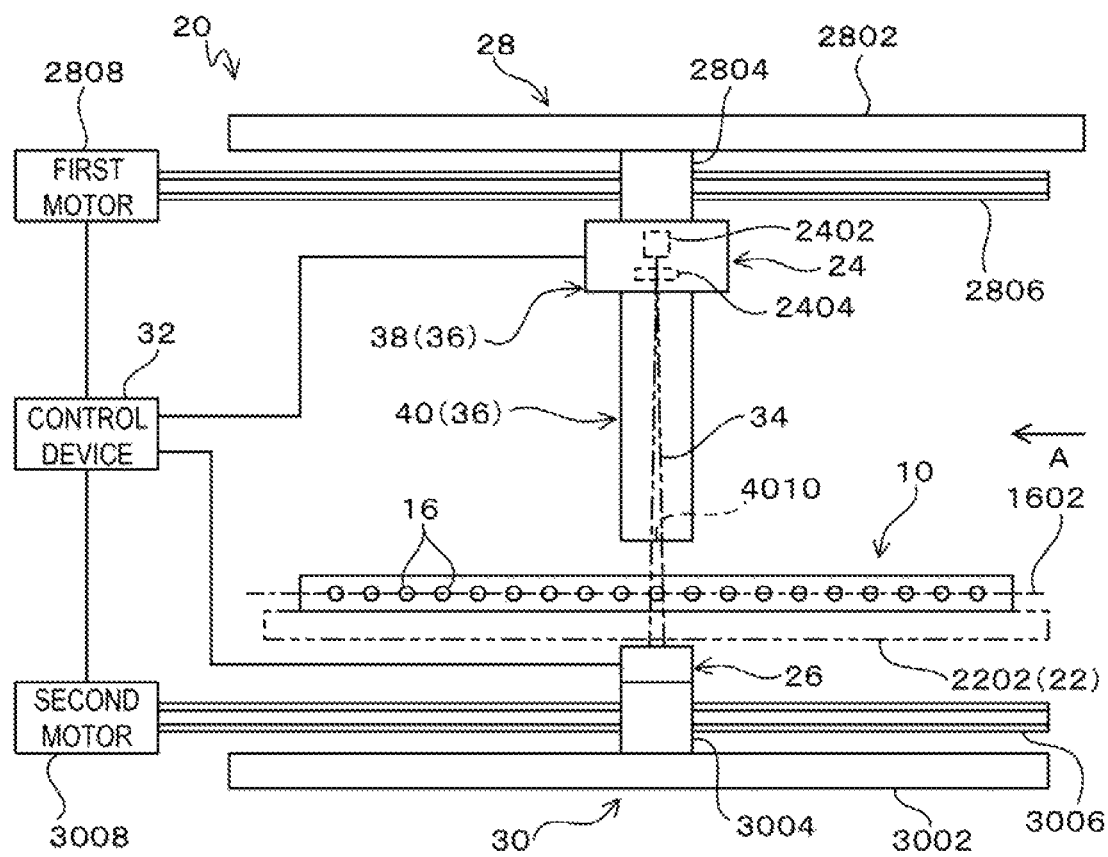
FIG. 1 is a front view illustrating the configuration of an inspection device for a conveyor belt according to an embodiment.
Figure 2:
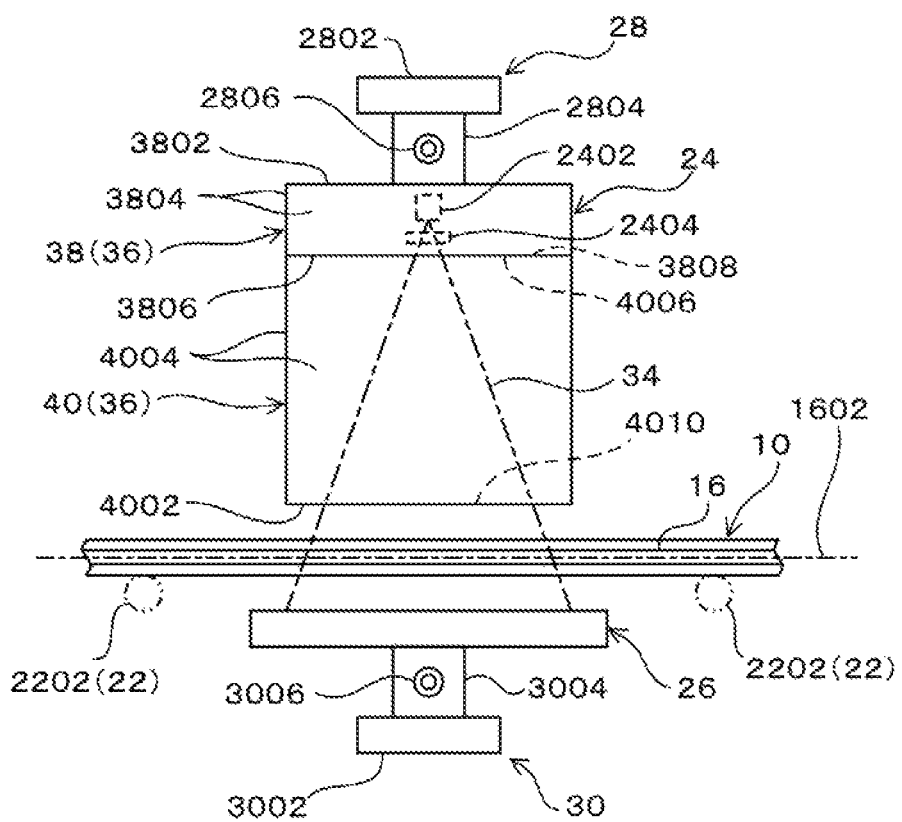
FIG. 2 is a view in the direction of arrow A of FIG. 1.

As illustrated in FIGS. 1 and 2, an inspection device 20 includes a conveying device 22, an X-ray generator 24, an X-ray line sensor 26, a first movement mechanism 28, a second movement mechanism 30, and a control device 32.

The conveying device 22 is configured to support at least a portion of the conveyor belt 10 to be inspected in the longitudinal direction thereof such that a plane 1602 including the plurality of steel cords 16 extends in a single plane, for example, on the horizontal plane, and is also configured to convey the conveyor belt 10 in the longitudinal direction thereof, i.e., the extension direction of the steel cords 16.

The conveying device 22, for example, includes a plurality of convey rollers 2202 on which the conveyor belt 10 is placed and a non-illustrated driving mechanism configured to drive the plurality of convey rollers 2202.

The X-ray generator 24 is disposed on one side of the conveyor belt 10, upper side in the present embodiment, in the direction orthogonal to the plane 1602 including the plurality of steel cords 16 and is configured to radiate X-rays 34 toward the plane 1602.

The X-ray generator 24 includes an X-ray source 2402 configured to generate the X-rays 34 in a cone-like manner (radiation beam), a collimator 2404 configured to limit the radiation angle of the X-rays 34 generated from the X-ray source 2402, and a case 36 configured to shield against the X-rays 34.

In the present embodiment, the case 36 includes a body case 38 and a shielding tube 40 attached to the lower portion of the body case 38.

As illustrated in FIG. 2, the body case 38 is configured to house the x-ray source 2402 and the collimator 2404 and includes a rectangular upper plate 3802, four side plates 3804 disposed in a vertical orientation and connected to the four sides of the upper plate 3802, and a lower plate 3806 that is connected to the lower ends of the four side plates 3804. A rectangular opening 3808 is provided in the lower plate 3806.

Figure 3:
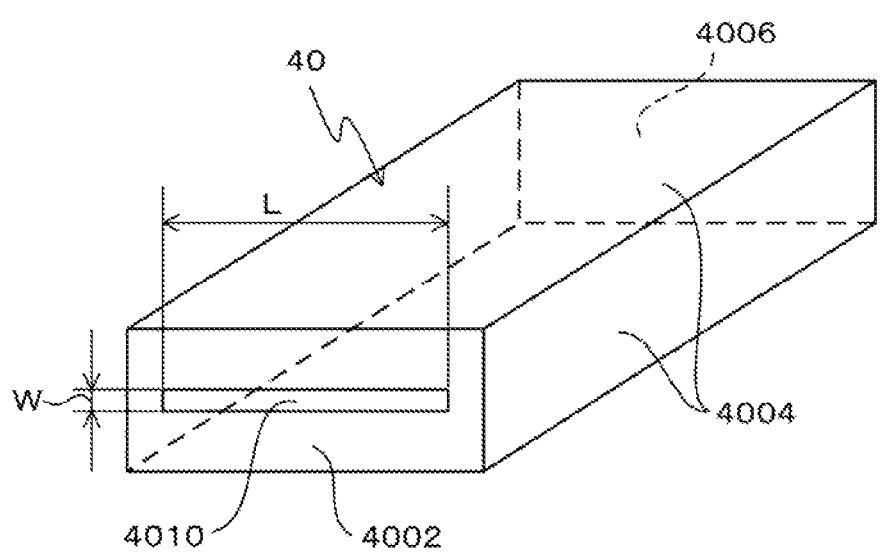
FIG. 3 is a perspective view of a shielding tube.

As illustrated in FIGS. 2 and 3, the shielding tube 40 includes a rectangular bottom plate 4002 and four side plates 4004 disposed in a vertical orientation and connected to the four side of the bottom plate 4002. A rectangular opening 4006 is defined by the upper ends of the four side plates 4004.

The opening 4006 of the shielding tube 40 and the opening 3808 of the body case 38 are aligned in the longitudinal direction and have a common center axis, and the upper ends of the side plates 4004 of the shielding tube 40 are attached to the lower plate 3806 of the body case 38 with the openings 4006, 3808 communicating with one another.

The bottom plate 4002 of the shielding tube 40 is provided with a slit 4010 through which the X-rays 34 radiated from the X-ray source 2402 radiate toward the conveyor belt 10 in a band-like manner conforming with the extension direction of the steel cords 16.

A width W of the slit 4010 is an easily machined dimension ranging from 1 mm to 3 mm. A length L dimension of the slit 4010 is such that the length of a band-like irradiation region of the X-rays 34 radiated from the slit 4010 at the upper surface (surface) of the conveyor belt 10 is equal to or less than the length of the X-ray line sensor 26 in the extension direction of the pixels. The amount of radiation of the X-rays 34 from the slit 4010 is set to a minimum so that the exposure dose of the worker is as little as possible.

As illustrated in FIGS. 1 and 2, the first movement mechanism 28 is configured to move the X-ray generator 24 in the direction parallel with the plane 1602 including the plurality of steel cords 16 and orthogonal to the extension direction of the steel cords 16, i.e., the width direction of the conveyor belt 10.

In the present embodiment, the first movement mechanism 28 includes a first rail 2802, a first table 2804, a first feed screw 2806, and a first motor 2808.

The first rail 2802 runs parallel with the plane 1602, extends in the direction orthogonal to the extension direction of the steel cords 16 as viewed from the direction orthogonal to the plane 1602, and is attached to a non-illustrated frame.

The first table 2804 is slidable along the first rail 2802, and the upper plate 3802 of the body case 38 of the X-ray generator 24 is attached to the first table 2804.

The first feed screw 2806 is engaged with the female screw of the first table 2804.

The first motor 2808 is configured to rotate the first feed screw 2806 in the forward or reverse direction.

By the first motor 2808 rotating in the forward or reverse direction, the first table 2804 is moved along the first rail 2802 via the first feed screw 2806. Accordingly, the X-ray generator 24 moves in the direction parallel with the plane 1602 including the plurality of steel cords 16 and orthogonal to the extension direction of the steel cords 16.

The X-ray line sensor 26 is disposed on the other side of the conveyor belt 10, lower side in the present embodiment, in the direction orthogonal to the plane 1602 including the plurality of steel cords 16, extends in the extension direction of the steel cords 16, and is configured to detect the X-rays 34 transmitted through the conveyor belt 10 and generate an X-ray transmission signal.

The X-ray line sensor 26 includes a plurality of pixels of a light-receiving element configured to receive the X-rays 34 aligned in a linear manner. Thus, the plurality of pixels of the light-receiving element are aligned in the extension direction of the steel cords 16.

The pixel pitch of the X-ray line sensor 26 is 0.2 mm, for example, and the dimension between pixels of the light-receiving element located at both ends in the longitudinal direction of the X-ray line sensor 26 is 512 mm, for example.

The second movement mechanism 30 is configured to move the X-ray line sensor 26 in the direction parallel with the plane 1602 including the plurality of steel cords 16 and orthogonal to the extension direction of the steel cords 16, i.e., the width direction of the conveyor belt 10.

In the present embodiment, the second movement mechanism 30 includes a second rail 3002, a second table 3004, a second feed screw 3006, and a second motor 3008.

The second rail 3002 runs parallel with the plane 1602, extends in the direction orthogonal to the extension direction of the steel cords 16 as viewed from the direction orthogonal to the plane 1602, and is attached to a non-illustrated frame.

The second table 3004 is slidable along the second rail 3002 and is attached to the X-ray line sensor 26.

The second feed screw 3006 is engaged with the female screw of the second table 3004.

The second motor 3008 is configured to rotate the second feed screw 3006 in the forward or reverse direction.

By the second motor 3008 rotating in the forward or reverse direction, the second table 3004 is moved along the second rail 3002 via the second feed screw 3006. Accordingly, the X-ray line sensor 26 moves in the direction parallel with the plane 1602 including the plurality of steel cords 16 and orthogonal to the extension direction of the steel cords 16.

Figure 4:
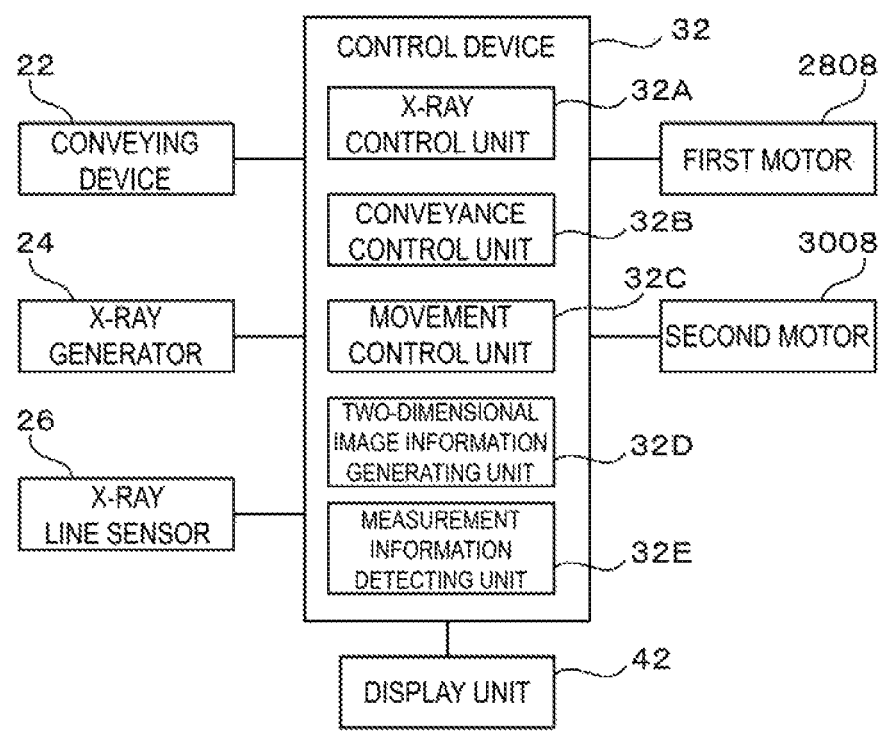
FIG. 4 is a block diagram illustrating the configuration of a control system for an inspection device for a conveyor belt according to an embodiment.

As illustrated in FIG. 4, the control device 32 is composed of a personal computer and includes a central processing unit (CPU), a read-only memory (ROM) in which a control program and the like are recorded and stored, a random-access memory (RAM) as a control program operating region, an electrically erasable programmable read-only memory (EEPROM) which retains various types of data to be rewritable, and an interface unit which is an interface with a peripheral circuit or the like.

The control device 32 is connected with the conveying device 22, the X-ray generator 24, the X-ray line sensor 26, the first motor 2808, the second motor 3008, and also a display unit 42 configured to display an image.

The control device 32, via execution of the control program by the CPU, functions as an X-ray control unit 32A, a conveyance control unit 32B, a movement control unit 32C, a two-dimensional image information generating unit 32D, and a measurement information detecting unit 32E.

The X-ray control unit 32A is configured to control the X-ray generator 24 to radiate the X-rays 34 from the X-ray generator 24.

The conveyance control unit 32B is configured to control the conveying device 22 to convey the conveyor belt 10 in the longitudinal direction thereof.

The movement control unit 32C is configured to control the first movement mechanism 28 and the second movement mechanism 30, i.e., supply synchronized control signals to the first motor 2808 and the second motor 3008, to move the X-ray generator 24 and the X-ray line sensor 26 in a fixed relative position at a certain speed within a certain movement range in the direction parallel with the plane 1602 and orthogonal to the extension direction of the steel cords 16.

By the X-ray generator 24 and the X-ray line sensor 26 having a fixed relative position, as illustrated in FIG. 1, as viewed from the extension direction of the plurality of steel cords 16, the X-rays 34 radiated from the X-ray generator 24 and transmitted through the conveyor belt 10 in the direction orthogonal to the plane 1602 including the plurality of steel cords 16 are detected by the X-ray line sensor 26.

Note that the certain movement range described above is set to a dimension in a range equal to or greater than the entire length of the conveyor belt 10 in the width direction sufficient for the X-rays 34 from the X-ray generator 24 to be radiated at the conveyor belt 10 and for the X-rays 34 transmitted through the conveyor belt 10 to be detected by the X-ray line sensor 26.

In the present embodiment, the movement control unit 32C, the first movement mechanism 28, and the second movement mechanism 30 compose a movement portion.

The two-dimensional image information generating unit 32D is configured to generate two-dimensional image information from the X-ray transmission signal generated by the X-ray line sensor 26.

The two-dimensional image information generating unit 32D generates two-dimensional image information on the basis of the X-ray transmission signal obtained each time the X-ray generator 24 and the X-ray line sensor 26 move a unit amount equal to the pixel pitch of the X-ray line sensor 26. In the generation of two-dimensional image information, various, known image processing such as binarization of the X-ray transmission signal may be used.

Here, the two-dimensional image information generating unit 32D finds the amount of movement of the X-ray generator 24 and the X-ray line sensor 26 on the basis of the synchronized control signal supplied to the first motor 2808 and the second motor 3008 from the movement control unit 32C.

In other words, when the X-rays 34 radiated from the X-ray generator 24 and transmitted through the conveyor belt 10 are detected by the X-ray line sensor 26, an X-ray transmission signal with luminance corresponding to the intensity distribution of the X-rays 34 is generated by the X-ray line sensor 26.

Accordingly, the luminance of the X-ray transmission signal at the portion where the steel cords 16 are located is the lowest, the luminance of the X-ray transmission signal at the portion of the rubber layers 14A, 14B where the steel cords 16 are not located is higher than that of the portion where the steel cords 16 are located, and the luminance of the X-ray transmission signal at the portion where no conveyor belt 10 is located is the highest.

Figure 5:
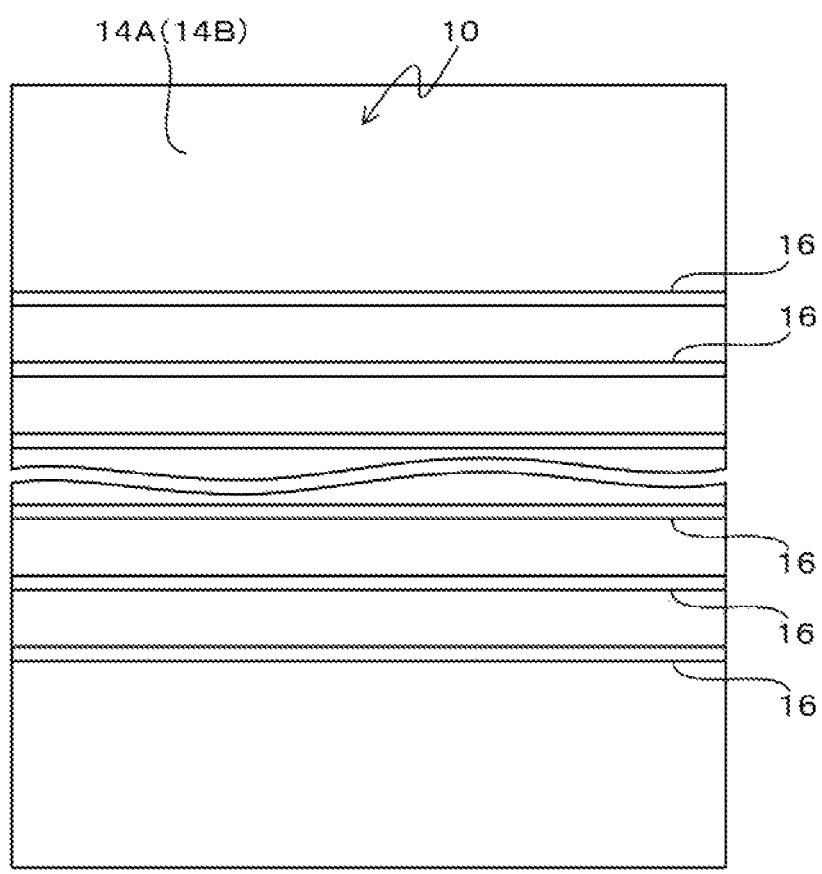
FIG. 5 is an explanatory diagram of two-dimensional image information generated by an inspection device for a conveyor belt according to an embodiment.

Thus, as illustrated in FIG. 5, when image processing is performed on the X-ray transmission signal, an image of the conveyor belt 10 and the steel cords 16 is generated as two-dimensional image information.

Additionally, as described above, as viewed from the extension direction of the plurality of steel cords 16, the X-rays 34 radiated from the X-ray generator 24 and transmitted through the conveyor belt 10 in the direction orthogonal to the plane 1602 including the plurality of steel cords 16 are detected by the X-ray line sensor 26 extending in the extension direction of the steel cords 16. Accordingly, distortion in the image of the conveyor belt 10 and the steel cords 16 generated as two-dimensional image information is kept to a minimum, and the two-dimensional image information of the image of the conveyor belt 10 and the steel cords 16 can have high accuracy.

The measurement information detecting unit 32E is configured to detect measurement information relating to the conveyor belt 10 and the steel cords 16 on the basis of the two-dimensional image information.

Specifically, as illustrated in FIG. 6, measurement information includes cord pitch P, distance between end cords B1, edge rubber width B2, and belt width B0.

Additionally, the control device 32 is configured to output and display the two-dimensional image information generated by the two-dimensional image information generating unit 32D and the measurement information detected by the measurement information detecting unit 32E, on the display unit 42.

The control device 32 may print out the two-dimensional image information and the measurement information using a non-illustrated printer device, or may record the two-dimensional image information and the measurement information on a non-illustrated recording medium.

Figure 7:
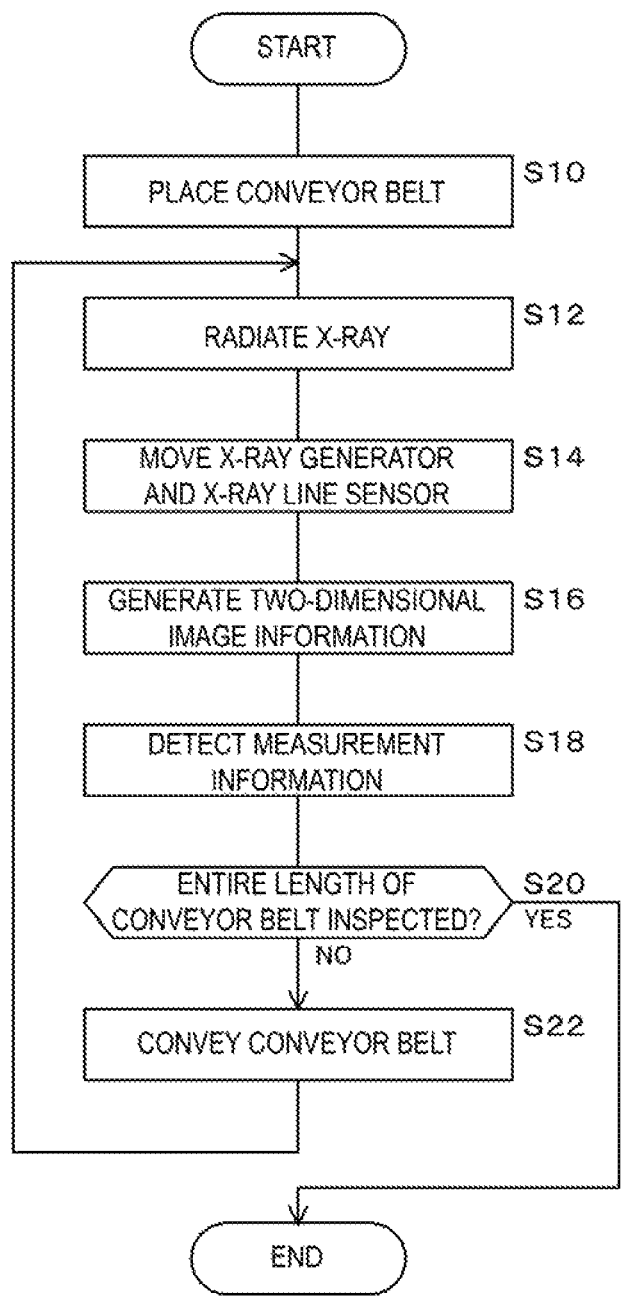
FIG. 7 is an operation flowchart of an inspection device for a conveyor belt according to an embodiment.

Next the effects of the inspection device 20 will be described with reference to the flowchart of FIG. 7.

First, the conveyor belt 10 to be inspected is placed on the conveying device 22 (step S10).

Next, the control device 32 is operated to make the X-ray generator 24 radiate the X-rays 34 toward the conveyor belt 10 (step S12: X-ray control unit 32A).

Here, as illustrated in FIGS. 1 and 2, the X-rays 34 are radiated from the X-ray source 2402 in a fan-like shape with respect to the extension direction of the steel cords 16 by being passed through the collimator 2404 and the slit 4010, before passing through the conveyor belt 10 and reaching the X-ray line sensor 26.

In this state, the control device 32 controls the first movement mechanism 28 and the second movement mechanism 30 to make the X-ray generator 24 and the X-ray line sensor 26 move in a fixed relative position at a certain speed within a certain movement range in the direction parallel with the plane 1602 and orthogonal to the extension direction of the steel cords 16 (step S14: movement portion).

Accordingly, the X-rays 34 radiated in a fan-like shape are moved across the entire length of the conveyor belt 10 in the width direction at a certain speed within a certain range in the direction orthogonal to the extension direction of the steel cords 16.

The control device 32 generates two-dimensional image information on the basis of the X-ray transmission signal obtained each time the X-ray generator 24 and the X-ray line sensor 26 move a unit amount equal to the pixel pitch of the X-ray line sensor 26 (step S16: two-dimensional image information generating unit 32D).

Next, the control device 32 detects measurement information relating to the conveyor belt 10 and the steel cords 16 on the basis of the obtained two-dimensional image information (step S18: measurement information detecting unit 32E).

Then, the control device 32 determines whether inspection of the entire length of the conveyor belt 10 has been completed (step S20).

In a case where inspection has not been completed, the control device 32 controls the conveying device 22 to convey the conveyor belt 10 so that the X-rays 34 radiate at a region of the conveyor belt 10 adjacent to a region for which two-dimensional image information has been generated but for which two-dimensional image information has not been generated (step S22: conveyance control unit 32B).

Next, the process returns to step S12 and repeats in a similar manner.

In a case of YES in step S20, the control device 32 completes inspection and displays the inspection result, i.e., the two-dimensional image information and measurement information, on the display unit 42 or performs other processes on the inspection result such as printing it out or recording it on a recording medium.

According to the present embodiment as described above, as viewed from the extension direction of the plurality of steel cords 16, the X-rays 34 radiated from the X-ray generator 24 and transmitted through the conveyor belt 10 in the direction orthogonal to the plane 1602 including the plurality of steel cords 16 are detected by the X-ray line sensor 26 extending in the extension direction of the steel cords 16. Accordingly, distortion in the image of the conveyor belt 10 and the steel cords 16 generated as two-dimensional image information is kept to a minimum. Thus, the two-dimensional image information of the image of the conveyor belt 10 and the steel cords 16 can have high accuracy.

This is advantageous in that highly accurate measurement information relating to the conveyor belt 10 and the steel cords 16 can be obtained for any portion of the conveyor belt 10 in the longitudinal direction and advantageous in that the quality assurance of the conveyor belt 10 can be performed in detail.

Additionally, inspection is not limited to being performed after the conveyor belt 10 is manufactured as in the related art, and in-line inspection can be performed during manufacture. This is advantageous in that the manufacturing cost of the conveyor belt 10 can be reduced by allowing manufacture to be stopped immediately upon finding a defect during manufacture of the conveyor belt 10 and measures to be taken.

Additionally, according to the present embodiment, the two-dimensional image information is generated by the two-dimensional image information generating unit 32D on the basis of the X-ray transmission signal obtained each time the X-ray generator 24 and the X-ray line sensor 26 move a unit amount equal to the pixel pitch of the X-ray line sensor 26. This is advantageous in that highly accurate inspection can be performed because two-dimensional image information can be obtained at a resolution corresponding to the pixel pitch of the X-ray line sensor 26.

Additionally, according to the present embodiment, cord pitch P, distance between end cords B1, edge rubber width B2, and belt width B0 can be determined to be the measurement information. This is advantageous in that the quality assurance of the conveyor belt 10 can be performed in detail.

Furthermore, according to the present embodiment, the X-ray generator 24 includes the case 36 configured to house the X-ray source 2402 and to shield against the X-rays 34 generated from the X-ray source 2402. The case 36 is provided with the slit 4010 through which the X-rays 34 generated from the X-ray source 2402 radiate toward the conveyor belt 10 in a band-like manner conforming with the extension direction of the steel cords 16.

By the X-rays 34 generated from the X-ray source 2402 being shielded by the case 36, the exposure dose of a worker in the vicinity of the inspection device 20 is reduced. This ensures that workers can work for a long time and is advantageous in that work efficiency is increased.

Note that the present embodiment was described as having a configuration in which the X-ray generator 24 and the first movement mechanism 28 are disposed above the conveyor belt 10 and the X-ray line sensor 26 and the second movement mechanism 30 are disposed below the conveyor belt 10.

However, obviously, a configuration opposite to the present embodiment in which the X-ray generator 24 and the first movement mechanism 28 are disposed below the conveyor belt 10 and the X-ray line sensor 26 and the second movement mechanism 30 are disposed above the conveyor belt 10 can be employed.

Additionally, the present embodiment was described as having a configuration in which the first movement mechanism 28 and the second movement mechanism 30 move the tables 2804, 3004 via the feed screws 2806, 3006 using the motors 2808, 3008.

However, obviously, the configuration of the first movement mechanism 28 and the second movement mechanism 30 is discretionary, and a known movement mechanism such as a linear-motion electric-powered actuator using a linear motor or a single axis robot can be employed.

Furthermore, the present embodiment was described as having a configuration in which the conveyor belt 10 is conveyed in the longitudinal direction thereof by the conveying device 22.

However, instead of the conveying device 22, a movement mechanism can be provided, the movement mechanism being configured to convey the X-ray generator 24 and the X-ray line sensor 26 in the longitudinal direction of the conveyor belt 10 in a fixed relative position.

The invention claimed is:

1. An inspection device for a conveyor belt comprising a reinforcing layer that comprises a plurality of steel cords aligned at intervals and a rubber layer covering the reinforcing layer, the inspection device comprising:
    an X-ray generator disposed on one side of the conveyor belt in a direction orthogonal to a plane comprising the plurality of steel cords, the X-ray generator being configured to radiate X-rays toward the plane;
    an X-ray line sensor disposed on another side of the conveyor belt in the direction orthogonal to the plane and extending in an extension direction of the plurality of steel cords, the X-ray line sensor being configured to detect X-rays transmitted through the conveyor belt and generate an X-ray transmission signal;
    a movement portion configured to move the X-ray generator and the X-ray line sensor synchronously in a fixed relative position between the X-ray generator and the X-ray line sensor at a certain speed within a certain movement range in a direction parallel with the plane of the steel cords and orthogonal to the extension direction of the plurality of steel cords;
    a two-dimensional image information generating unit configured to generate two-dimensional image information from the X-ray transmission signal generated by the X-ray line sensor; and
    a measurement information detecting unit configured to detect measurement information relating to the conveyor belt and the plurality of steel cords based on the two-dimensional image information.

2. The inspection device for a conveyor belt according to claim 1, wherein
    the two-dimensional image information generating unit is configured to generate the two-dimensional image information based on the X-ray transmission signal obtained each time the X-ray generator and the X-ray line sensor move a unit amount equal to a pixel pitch of the X-ray line sensor.

3. The inspection device for a conveyor belt according to claim 1, wherein
    the measurement information comprises: cord pitch, which is an interval between the plurality of steel cords; distance between end cords, which is an interval between steel cords of the plurality of steel cords positioned at both ends of the conveyor belt in a width direction; edge rubber width, which is a distance from an end surface of the conveyor belt in the width direction to an outer circumferential surface of a steel cord of the plurality of steel cords located adjacent to the end surface; and belt width, which is a distance between end surfaces on both ends of the conveyor belt in the width direction.

4. The inspection device for a conveyor belt according to claim 1, wherein
the X-ray generator comprises an X-ray source configured to generate the X-rays and a case configured to house the X-ray source and shield against X-rays generated from the X-ray source; and
the case comprises a slit through which the X-rays generated from the X-ray source radiate toward the conveyor belt in a band-like manner conforming with the extension direction of the plurality of steel cords.

5. The inspection device for a conveyor belt according to claim 4, wherein
the slit is formed with a length dimension such that a length of a band-like irradiation region of X-rays radiated from the slit at the conveyor belt is equal to or less than a length of the X-ray line sensor in an extension direction of pixels.

6. The inspection device for a conveyor belt according to claim 2, wherein
the measurement information comprises at least one of cord pitch, which is an interval between the plurality of steel cords; distance between end cords, which is an interval between steel cords of the plurality of steel cords positioned at both ends of the conveyor belt in a width direction; edge rubber width, which is a distance from an end surface of the conveyor belt in the width direction to an outer circumferential surface of a steel cord of the plurality of steel cords located adjacent to the end surface; or belt width, which is a distance between end surfaces on both ends of the conveyor belt in the width direction.

7. The inspection device for a conveyor belt according to claim 6, wherein
the X-ray generator comprises an X-ray source configured to generate the X-rays and a case configured to house the X-ray source and shield against X-rays generated from the X-ray source; and
the case comprises a slit through which the X-rays generated from the X-ray source radiate toward the conveyor belt in a band-like manner conforming with the extension direction of the plurality of steel cords.

8. The inspection device for a conveyor belt according to claim 7, wherein
the slit is formed with a length dimension such that a length of a band-like irradiation region of X-rays radiated from the slit at the conveyor belt is equal to or less than a length of the X-ray line sensor in an extension direction of pixels.

* * * * *